United States Patent
Duesel, Jr. et al.

(10) Patent No.: US 8,425,665 B2
(45) Date of Patent: Apr. 23, 2013

(54) FLUID SCRUBBER

(75) Inventors: Bernard F. Duesel, Jr., Goshen, NY (US); Michael J. Rutsch, Tulsa, OK (US)

(73) Assignee: Heartland Technology Partners, LLC, Kirkwood, MO (US)

( * ) Notice: Subject to any disclaimer, the term of this patent is extended or adjusted under 35 U.S.C. 154(b) by 1076 days.

(21) Appl. No.: 11/625,024

(22) Filed: Jan. 19, 2007

(65) Prior Publication Data

US 2008/0173176 A1    Jul. 24, 2008

(51) Int. Cl.
*B01D 47/02*    (2006.01)

(52) U.S. Cl.
USPC ............... 95/226; 96/350; 96/351; 422/176; 422/168

(58) Field of Classification Search .............. 422/176; 95/226; 96/333, 348, 337–346, 351–354; 261/77, 123–124

See application file for complete search history.

(56) References Cited

U.S. PATENT DOCUMENTS

| | | | |
|---|---|---|---|
| 2,387,818 A | | 10/1945 | Wethly |
| 2,468,455 A | * | 4/1949 | Metziger ............... 23/302 R |
| 2,619,421 A | | 11/1952 | Greenfield |
| 2,651,647 A | | 9/1953 | Greenfield |
| 2,658,735 A | | 11/1953 | Ybarrondo |
| 2,790,506 A | | 4/1957 | Vactor |

(Continued)

FOREIGN PATENT DOCUMENTS

| | | |
|---|---|---|
| CL | 757-2004 | 3/2010 |
| DE | 556 455 | 8/1932 |

(Continued)

OTHER PUBLICATIONS

A.G. Jones, *Liquid Circulation in a Draft-Tube Bubble Column*, Chemical Engineering Science, vol. 40, No. 3, pp. 449-462, 1985, Pergamon Press Ltd., Great Britain.

(Continued)

*Primary Examiner* — Duane Smith
*Assistant Examiner* — Ives Wu
(74) *Attorney, Agent, or Firm* — Marshall, Gerstein & Borun LLP

(57) ABSTRACT

A fluid scrubber in the form of a submerged gas reactor includes a reaction vessel, a gas delivery lube partially disposed within the reaction vessel to deliver a gas into the reaction vessel and a scrubbing liquid inlet that provides a scrubbing liquid to the reaction vessel at a rate sufficient to maintain a controlled, constant level of fluid within the reaction vessel. A weir is disposed within the reaction vessel adjacent the gas delivery tube to form a first fluid circulation path between a first weir end and a wall of the reaction vessel and a second fluid circulation path between a second weir end and an upper end of the reaction vessel. During operation, gas introduced through the tube mixes with the scrubbing liquid and the combined gas and liquid flow at a high rate with a high degree of turbulence along the first and second, circulation paths defined around the weir, thereby promoting vigorous mixing and intimate contact between the gas and the scrubbing liquid. This turbulent flow develops a significant amount of interfacial surface area between the gas and the scrubbing liquid resulting in a reduction of the required residence time of the gas within the scrubbing liquid to achieve thermal equilibrium and/or to drive chemical reactions to completion, all of which leads to a more efficient and complete evaporation, chemical reaction, or combined evaporation and chemical reaction process.

10 Claims, 7 Drawing Sheets

U.S. PATENT DOCUMENTS

| | | | |
|---|---|---|---|
| 2,867,972 A | 1/1959 | Hokderreed et al. | |
| 2,879,838 A | 3/1959 | Flynt et al. | |
| 2,890,166 A | 6/1959 | Heinze | |
| 2,911,421 A | 11/1959 | Greenfield | |
| 2,911,423 A | 11/1959 | Greenfield | |
| 2,946,401 A * | 7/1960 | Serner | 55/444 |
| 2,979,408 A | 4/1961 | Greenfield | |
| 2,981,250 A | 4/1961 | Steward | |
| 3,060,921 A | 10/1962 | Luring et al. | |
| 3,076,715 A | 2/1963 | Greenfield | |
| 3,211,538 A | 10/1965 | Gross et al. | |
| 3,212,235 A | 10/1965 | Markant | |
| 3,215,189 A | 11/1965 | Bauer | |
| 3,251,398 A | 5/1966 | Greenfield | |
| 3,284,064 A | 11/1966 | Kolm et al. | |
| 3,304,991 A | 2/1967 | Greenfield | |
| 3,323,575 A | 6/1967 | Greenfield | |
| 3,405,918 A | 10/1968 | Calaceto et al. | |
| 3,432,399 A | 3/1969 | Schutt | |
| 3,539,549 A | 11/1970 | Greenfield | |
| 3,601,374 A | 8/1971 | Wheeler | |
| 3,638,924 A | 2/1972 | Calaceto et al. | |
| 3,713,786 A | 1/1973 | Umstead | |
| 3,716,458 A | 2/1973 | Greenfield | |
| 3,743,483 A | 7/1973 | Shah | |
| 3,756,580 A | 9/1973 | Dunn | |
| 3,756,893 A | 9/1973 | Smith | |
| 3,762,893 A * | 10/1973 | Larsen | 48/127.1 |
| 3,782,300 A * | 1/1974 | White et al. | 110/238 |
| 3,789,902 A | 2/1974 | Shah et al. | |
| 3,838,974 A | 10/1974 | Hemsath et al. | |
| 3,840,002 A | 10/1974 | Douglas et al. | |
| 3,844,748 A | 10/1974 | Lanier | |
| 3,855,079 A * | 12/1974 | Greenfield et al. | 203/47 |
| 3,870,585 A | 3/1975 | Kearns et al. | |
| 3,876,490 A | 4/1975 | Tsuruta | |
| 3,898,134 A | 8/1975 | Greenfield | |
| 3,917,508 A | 11/1975 | Greenfield | |
| 3,925,148 A | 12/1975 | Erwin | |
| 3,938,738 A * | 2/1976 | Nagel et al. | 239/9 |
| 3,947,327 A | 3/1976 | Greenfield | |
| 3,950,230 A | 4/1976 | Greenfield | |
| 4,007,094 A | 2/1977 | Greenfield | |
| 4,013,516 A | 3/1977 | Greenfield | |
| 4,026,682 A | 5/1977 | Pausch | |
| 4,060,587 A * | 11/1977 | Lewis | 423/210 |
| 4,119,538 A | 10/1978 | Yamauchi et al. | |
| 4,230,536 A | 10/1980 | Sech | |
| 4,259,185 A | 3/1981 | Mixon | |
| 4,270,974 A | 6/1981 | Greenfield | |
| 4,276,115 A | 6/1981 | Greenfield | |
| 4,289,578 A | 9/1981 | Greenfield et al. | |
| 4,300,924 A | 11/1981 | Coyle | |
| 4,336,101 A | 6/1982 | Greenfield | |
| RE31,185 E | 3/1983 | Greenfield | |
| 4,432,914 A | 2/1984 | Schifftner | |
| 4,440,098 A | 4/1984 | Adams | |
| 4,518,458 A | 5/1985 | Greenfield | |
| 4,608,120 A | 8/1986 | Greenfield | |
| 4,648,973 A | 3/1987 | Hultholm et al. | |
| 4,683,062 A | 7/1987 | Krovak et al. | |
| 4,863,644 A * | 9/1989 | Harrington et al. | 261/77 |
| 4,913,065 A | 4/1990 | Hemsath | |
| 5,009,511 A | 4/1991 | Sarko et al. | |
| 5,030,428 A | 7/1991 | Dorr et al. | |
| 5,032,230 A * | 7/1991 | Shepherd | 202/176 |
| 5,076,895 A | 12/1991 | Greenfield et al. | |
| 5,122,169 A * | 6/1992 | Schumacher et al. | 96/242 |
| 5,132,090 A | 7/1992 | Volland | |
| 5,154,898 A * | 10/1992 | Ajinkya et al. | 422/227 |
| 5,190,670 A * | 3/1993 | Stearns | 210/767 |
| 5,238,580 A | 8/1993 | Singhvi | |
| 5,279,646 A | 1/1994 | Schwab | |
| 5,336,284 A | 8/1994 | Schifftner | |
| 5,342,482 A | 8/1994 | Duesel et al. | |
| 5,378,267 A * | 1/1995 | Bros et al. | 96/168 |
| 5,484,471 A | 1/1996 | Schwab | |
| 5,486,341 A * | 1/1996 | Bresowar | 423/243.01 |
| 5,512,085 A | 4/1996 | Schwab | |
| 5,552,022 A | 9/1996 | Wilson | |
| 5,585,005 A | 12/1996 | Smith et al. | |
| 5,636,623 A | 6/1997 | Panz et al. | |
| 5,656,155 A * | 8/1997 | Norcross et al. | 210/149 |
| 5,759,233 A | 6/1998 | Schwab | |
| 5,934,207 A | 8/1999 | Echols et al. | |
| 5,968,352 A | 10/1999 | Ditzler | |
| 6,007,055 A | 12/1999 | Schifftner | |
| 6,149,137 A * | 11/2000 | Johnson et al. | 261/27 |
| 6,293,277 B1 | 9/2001 | Panz et al. | |
| 6,383,260 B1 | 5/2002 | Schwab | |
| 6,391,100 B1 | 5/2002 | Hogan | |
| 6,402,816 B1 * | 6/2002 | Trivett et al. | 95/226 |
| 6,485,548 B1 | 11/2002 | Hogan | |
| 6,547,855 B1 * | 4/2003 | Schmidtke | 95/149 |
| 6,616,733 B1 | 9/2003 | Pellegrin | |
| 6,719,829 B1 | 4/2004 | Schwab | |
| 6,913,671 B2 | 7/2005 | Bolton et al. | |
| 7,074,339 B1 | 7/2006 | Mims | |
| 7,111,673 B2 | 9/2006 | Hugill | |
| 7,142,298 B2 | 11/2006 | Nuspliger | |
| 7,144,555 B1 * | 12/2006 | Squires et al. | 422/168 |
| 7,156,985 B1 | 1/2007 | Frisch | |
| 7,214,290 B2 * | 5/2007 | Duesel et al. | 159/16.2 |
| 7,332,010 B2 * | 2/2008 | Steiner | 55/486 |
| 7,402,247 B2 | 7/2008 | Sutton | |
| 7,416,172 B2 * | 8/2008 | Duesel et al. | 261/77 |
| 7,416,177 B2 | 8/2008 | Suzuki et al. | |
| 7,424,999 B2 * | 9/2008 | Xu et al. | 261/97 |
| 7,459,135 B2 | 12/2008 | Pieterse et al. | |
| 7,488,373 B2 * | 2/2009 | Haland et al. | 95/268 |
| 7,572,626 B2 | 8/2009 | Frisch et al. | |
| 7,594,942 B2 * | 9/2009 | Polderman | 55/321 |
| 7,758,819 B2 | 7/2010 | Nagelhout | |
| 2002/0069838 A1 | 6/2002 | Rautenbach et al. | |
| 2002/0158024 A1 * | 10/2002 | Van Slyke et al. | 210/696 |
| 2004/0040671 A1 | 3/2004 | Duesel et al. | |
| 2004/0045681 A1 | 3/2004 | Bolton et al. | |
| 2004/0213721 A1 * | 10/2004 | Arno et al. | 423/240 R |
| 2005/0074712 A1 * | 4/2005 | Brookshire et al. | 431/202 |
| 2007/0251650 A1 | 11/2007 | Duesel et al. | |
| 2008/0174033 A1 * | 7/2008 | Duesel et al. | 261/121.1 |
| 2008/0213137 A1 | 9/2008 | Frisch et al. | |
| 2008/0265446 A1 * | 10/2008 | Duesel et al. | 261/136 |

FOREIGN PATENT DOCUMENTS

| | | |
|---|---|---|
| DE | 11 73 429 | 7/1964 |
| FR | 2 441 817 | 6/1980 |
| GB | 383 570 | 11/1932 |
| GB | 383570 | * 11/1932 |
| GB | 463 770 | 4/1937 |
| GB | 463770 | * 4/1937 |
| WO | WO-2004/022487 | 3/2004 |

OTHER PUBLICATIONS

Hirotsugu Hattori et al., *Fluid and Solids Flow Affecting the Solids Circulation Rate in Spouted Beds with a Draft Tube*, Journal of Chemical Engineering of Japan, vol. 37, No. 9, pp. 1085-1091, 2004, Shinshu University, Japan.

M. Yoshino et al., *Removal and Recovery of Phosphate and Ammonium as Struvite from Supernatant in Anaerobic Digestion*, Water Science and Technology, vol. 48, No. 1, pp. 171-178, 2003, IWA Publishing, Japan.

D. Fox et al., *Control Mechanisms of Fluidized Solids Circulation Between Adjacent Vessels*, AIChE Journal, Dec. 1989, vol. 35, No. 12, pp. 1933-1941, Universite de Technologie de Compiegne, France.

Liang-Shih Fan et al., *Some Remarks on Hydrodynamic Behavior of a Draft Tube Gas-Liquid-Solid Fluidized Bed*, Department of Chemical Engineering, The Ohio State University, Columbus, Ohio 43210.

N.D. Barrett et al., *The Industrial Potential and Economic Viability of Spouted Bed Processes*, Chemeca 85, paper D4c, pp. 401-405, The Thirteenth Australasian Conference on Chemical Engineering, Perth, Australia, Aug. 1985.

J.K. Claflin, *Intraparticle Conduction Effects on the Temperature Profiles in Spouted Beds*, Chemeca 85, paper D9b, pp. 471-475, The Thirteenth Australasian Conference on Chemical Engineering, Perth, Australia, Aug. 1985.

Dawn Smith, *Sludge-U-Like, as the Ban on Sea Disposal of Sewage Waste Looms, Technologies That Can Deliver Cleaner, Thicker and More Farmer-Friendly Sludges are Gaining Popularity*, Water Bulletin 708, Jun. 21, 1996.

Harry Brandt, et al., *Treatment Process for Waste Water Disposal of the "Morcinek" Mine Using Coalbed Methane*, Conference on Coalbed Methane Utilization, Oct. 5-7, 1994, Katowice, Poland.

Yutaka Miyake et al., *Performance Characteristics of High Speed-Type Cross Flow Turbine*, 1993.

Ho-Ming Yeh et al., *Double-Pass Heat or Mass Transfer Through a Parallel-Plate Channel with Recycle*, International Journal of Hat and Mass Transfer 43 pp. 487-491, 2000, Department of Chemical Engineering, Tamkang University, Tamisui, Taipei 251, Taiwan.

Sathyanarayana et al., *Circular C.W. Intake System—A Research Opinion*, Seventh Technical Conference of the British Pump Manufacturer's Association, paper 21, pp. 293-313, 1981.

Caridad Talbert et al., *The Elecrospouted Bed*, IEEE Transactions on Industry Applications, vol. 1A-20, No. 5, Sep./Oct. 1984, pp. 1220-1223.

Wayne J. Genck, *Guidelines for Crystallizer Selection and Operation*, CEP, Oct. 2004, pp. 26-32. www.cepmagazine.org.

M. K. Bennett et al., *Design of a Software Application for the Simulation and Control of Continuous and Batch Crystallizer Circuits*, Advances in Engineering Software 33, 2002, pp. 365-374, Department of Chemical and Biochemical Engineering, Faculty of Engineering Science, University of Western Ontario, London, Ont. Canada N6A 5B9.

G. A. St. Onge et al., *Start-Up, Testing, and Performance of the First Bulb-Type Hydroelectric Project in the U.S.A.*, IEEE Transactions on Power Apparatus Systems, vol. PAS-101, No. 6, Jun. 1982, pp. 1313-1321.

Nely T. Padial et al., *Three-Dimensional Simulation of a Three-Phase Draft-Tube Bubble Column*, Chemical Engineering Science 55 (2000), pp. 3261-3273.

J. K. Claflin et al., *The Use of Spouted Beds for the Heat Treatment of Grains*, Chemeca 81, The 9th Australasian Conference on Chemical Engineering, Christchurch, New Zealand, Aug. 30 to Sep. 4, 1981, pp. 65-72.

R. Swaminathan et al., *Some Aerodynamic Aspects of Spouted Beds of Grains*, Department of Chemical Engineering, McGill University, Montreal, Quebec, Canada, pp. 197-204.

W.A. Cross et al., *Leachate Evaporation by Using Landfill Gas*, Proceedings Sardinia 97, Sixth Landfill Symposium, S. Margherita di Pula, Cagliari, Italy, Oct. 13-17, 1997, pp. 413-422.

Z. H. Ye et al., *Removal and Distribution of Iron, Manganese, Cobalt, and Nickel Within a Pennsylvania Constructed Wetland Treating Coal Combustion By-Product Leachate*, J. Environ. Qual. 30:1464-1473, 2001.

R. Williams et al., *Aspects of Submerged Combustion as a Heat Exchange Method*, Trans IChemE, vol. 71, Part A, May 1993, pp. 308-309.

J. C. Mueller et al., *Rotating Disk Looks Promising for Plant Wastes*.

Kenneth Dunn, *Incineration's Role in Ultimate Disposal of Process Wastes*, Chemical Engineering, Deskbook Issue, Oct. 6, 1975, pp. 141-150.

Harry Berg, *The Development of the Controlled Buoyancy System for Installation of Submerged Pipelines*, Journal AWWA, Water Technology/Quality, Mar. 1977, pp. 214-218.

Yasutoshi Shimizu et al., *Filtration Characteristics of Hollow Fiber Microfiltration Membranes Used in Membrane Bioreactor for Domestic Wastewater Treatment*, Wat. res. vol. 30, No. 10, pp. 2385-2392, 1996.

Philip Bachand et al., *Denitrification in Constructed Free-Water Surface Wetlands: II. Effects of Vegetation and Temperature*, Ecological Engineering 14, pp. 17-32, 2000.

M. Etzensperger et al., *Phenol Degradation in a Three-Phase Biofilm Fluidized Sand Bed Reactor*, Bioprocess Engineering 4, pp. 175-181, 1989.

G. I. Cherednichenko et al., *Disposal of Saline Wastes From Petroleum Refineries*, All-Union Scientific-Research and Planning-Design Institute of the Petroleum Refining and Petrochemical Industry, Translated from Khimiya I Tekhnologiya Topliv I Masel, No. 9, pp. 37-39, Sep. 1974.

E. L. Durkee et al., *Field Tests of Salt Recovery System for Spent Pickle Brine*.

Marko Hocevar et al., *The Influence of Draft-Tube Pressure Pulsations on the Cavitation-Vortex Dynamics in a Francis Turbine*, Journal of Mechanical Engineering 49, 2003, pp. 484-498.

German Kurz, *Tauchbrenner*, OI U. Gasfeuerung, 18 (3), 1973, pp. 171-180.

Schoene, O, "Die Entolung des Abdampfes und der Kondensate von Kolbendampfmaschinen," Braunkohle, 31:82-92 (1932).

Alabovskij et al., *Evaporation Des Eaux De Lavage De Chaudieres Dans Des Appareils A Combustion Immergee*, Promyshl. Energet, 1975 (4), pp. 38-39.

International Search Report issued in PCT/US2006/028515 mailed on Nov. 14, 2006.

International Preliminary Report on Patentability for Application No. PCT/US2007/001487, dated Jul. 21, 2009.

International Preliminary Report on Patentability for Application No. PCT/US2007/001632, dated Jul. 21, 2009.

International Preliminary Report on Patentability for Application No. PCT/US2007/001633, dated Jul. 21, 2009.

International Preliminary Report on Patentability for Application No. PCT/US2007/001634, dated Jul. 21, 2009.

Office action from Chilean Patent Application No. 238-2007.

English language translation of an office action from Chilean Patent Application No. 237-2007.

English Translation of Hage, H., "The MeMon Experiment: A Step towards Large-Scale Processing of Manure," Applied Science, 4 (1988).

English Translation of Office Action for Chilean Patent No. 237-2007.

Office Action for U.S. Appl. No. 11/625,002, dated Jan. 6, 2010.

Final Office Action for U.S. Appl. No. 11/625,002, dated May 26, 2010.

Notice of Allowance for U.S. Appl. No. 11/625,159, dated Jul. 9, 2010.

Office Action for U.S. Appl. No. 11/625,022, dated Jun. 22, 2010.

Final Office Action for U.S. Appl. No. 11/625,022, dated Jan. 24, 2011.

LFG Specialties, LLC. 2006 Product Catalog.

Screen shots from video on LFG website taken Jan. 18, 2011 (http://www.shawgrp.com/markets/envservices/envsolidwaste/swlfg).

\* cited by examiner

FLUID SCRUBBER

FIELD OF THE DISCLOSURE

The disclosure relates generally to scrubbers, and more specifically, to fluid scrubbers that remove pollutants from gases.

BACKGROUND

Fluid scrubbers are generally used to remove pollutants found in contaminated gases, such as waste gases from industrial operations. Pollutants that maybe removed by fluid scrubbers include fumes, gases, particulate, and oil mists that might be carried in waste gas streams. Within fluid scrubbers, pollutants are transferred from a gas stream and sequestered within a scrubbing liquid by mechanisms that include inertial impaction, reaction with a sorbent or reagent slurry, or absorption into a liquid solvent.

Scrubbing liquids are generally selected on the basis of costs and performance and may be solutions or slurries. In order to perform effectively, the scrubber liquid must have an affinity for target pollutants in order to create an adequate driving force for the pollutants to migrate from the gas phase and remain sequestered in the scrubber liquid. Depending on the nature of a particular target pollutant, suitable driving forces may include the solubility of the pollutant in the liquid phase or the affinity of a target pollutant for a particular reactant within the scrubber liquid. In the case of some pollutants that are in the form of particulate matter, thorough wetting of the surface of the particle through the mechanism of inertial impaction may be sufficient to allow capture and sequestration within the scrubber liquid. Some fluid scrubbing systems are configured to produce salable product as a means to improve the cost-efficiency of the scrubbing process.

In most conventional fluid scrubber systems the scrubbing liquid is collected in a sump and recycled back to the gas-liquid contact zone of the scrubbing system by a pumping system. The sumps usually includes mixing devices to maintain the scrubbing liquid in a homogeneous state and in some cases, such as flue gas desulfurization applications, the sumps also serve as reactors within which chemical reactions between sequestered pollutants and reagents are allowed to continue.

For fluid scrubbers to perform continuously and efficiently it is important to control the values of parameters within the scrubbing liquid that affect performance. The parameters to be controlled are specific to each application and may include one or more items such as the percentages of dissolved solids and/or suspended solids, reagents and other additives such as defoamers or wetting agents. In order to maintain the values of particular parameters within desirable ranges, scrubbing liquid is either periodically or continuously withdrawn from the sump (blow down) and an equal volume of fresh scrubbing liquid (make up) is added to the sump. Thus, the quality and total volume of scrubbing solution within the fluid scrubber may be maintained within desirable ranges.

While the methods used to manage blow down are specific to a particular scrubbing application the cost of managing blow down can have a significant impact on the overall costs of operation of fluid scrubbing system. Methods that might be employed to manage blow down include: direct discharge to a wastewater treatment plant; pre-treatment followed by direct discharge to surface water; treatment followed by recycle to the scrubbing system (e.g., removal, of suspended solids) or additional processing to recover salable material prior to disposal (e.g., recovering gypsum from flue gas desulfurization applications).

Other elements common to the design of conventional fluid scrubber systems are fans to move the gas stream through the scrubber and suitable means to separate entrained droplets of the scrubbing liquid from the gas phase before the gas is discharged from the scrubber. Positive pressure fans or induced draft fans located on the gas inlet or discharge sides of the scrubber, respectively, maybe used to move the gas phase through the scrubber. Various types of commercial demisting units are typically employed for separating liquid droplets from the gas phase. These units are usually located in proximity to the point, where the vapor exits the gas-liquid contact zone within the scrubbing system. The demisters generally capture entrained liquid droplets and return the collected droplets to the sump section either by gravity or a pump system.

In order lo perform effectively the fluid scrubber must include means for the scrubbing liquid and pollutant-laden gas stream to be brought into intimate contact so that target pollutants can be efficiently transferred from the gas phase into the liquid phase. Spray towers, packed towers and venturi devices are examples of conventional, types of fluid scrubbers that are in common use. As with most conventional fluid scrubbers, all three of these types of scrubbers rely on dispersing a discontinuous liquid phase into a continuous gas phase as the means of achieving the required intimate contact between the phases. However, distinct differences between the methods used to disperse the scrubbing liquid into the gas phase within each of these three types of conventional fluid scrubbers have a significant impact on the limitations of each type in relation to specific scrubbing applications.

Conventional spray tower fluid scrubbers typically use atomizing devices such as nozzles to disperse the scrubbing liquid as small, droplets into a spray chamber. Generally, smaller droplet sizes of scrubbing liquid improve the efficiency of spray tower fluid scrubbers by increasing the available surface area for intimate contact between the scrubbing liquid and gas phases. However, spray tower designs must strike a balance between the size of the atomized droplets and the energy requirements to first form very small droplets and then to separate such droplets from the flowing gas stream before the gas is discharged from the scrubber. Spray tower fluid scrubbers usually require significant headspace to accommodate the height of the tower. Among other factors, the height of the tower is generally a function of the time required to allow the liquid and gas phases to remain in contact in order for mass and heat transfer to reach equilibrium and for any possible chemical reactions to proceed to a desired degree of completion. Additionally, systems used for atomizing liquids within conventional spray tower scrubbers are prone to blockages and failure if suspended solids within the scrubber liquid build up and clog small passages of components such as nozzle orifices.

Conventional packed tower fluid scrubbers typically include spray nozzles or a weir at the top of a tower to uniformly distribute scrubbing liquid over packing within the tower. The packed tower type fluid scrubber relies on the extended surface area of the packing material to increase the contact area and contact time between the scrubbing liquid and gas by distributing the scrubbing liquid as a downward flowing film on the extended surface. Accordingly, packed tower type fluid scrubbers generally require regular maintenance (to clean the contact surfaces) and occasionally become clogged with suspended particles such as precipitates or insoluble particulate that is transferred from the gas phase.

Thus, packed tower fluid scrubbers are not suitable for scrubbing applications that utilize slurries for scrubbing liquids. An additional draw back to the packed tower type fluid scrubber is that a balance must be struck between the amount of void space in the packed tower and the restriction that the packing presents to the flow of gas in the gas-liquid contact zone. The void space creates a tortuous path that forces the gas into intimate contact with the liquid film flowing over the packing. Smaller void space increases the velocity of the gas over the liquid film and enhances turbulence, which improves the rates of mass and heat transfer from the gas to the liquid phase. Because a finite amount of void space must be employed and additional space is occupied by the mass of the packing, the height and overall volume of packed tower fluid scrubbers are generally greater than that of other types of fluid scrubbers with the exception of spray towers.

Conventional venturi scrubbers use turbulence created by high differential pressure between gases flowing at high velocity through a restricted volume (the venturi throat) and free-flowing scrubbing liquid to create and disperse extremely small droplets of scrubbing liquid within the gas phase. Venturi scrubbers are considered to be high energy devices that are suitable for collecting very small particles. While venturi scrubbers are usually more compact than spray tower or packed tower fluid scrubbers, the energy required for forcing the combined vapor and liquid phases through the restricted volume of the venturi is generally higher than the energy requirements for other types of conventional scrubbers. Also, because all of the scrubbing liquid passing through the venturi is broken down into extremely small droplets in a highly turbulent zone, the demisting section to recover and separate the droplets from the gas stream generally requires higher energy input than the demisters used for packed tower and spray tower fluid scrubbers. Further, in addition to the energy burden, the high energy released into the restricted area of the venturi accentuates the potential of corrosion within the venturi section by creating significant erosive forces.

Conventional fluid scrubbers have other drawbacks as well. For example, within all fluid scrubbers substances that are dissolved in the scrubbing liquid may precipitate due to solubility limitations. Precipitates in combination with any insoluble particles that are transferred to the liquid phase from the gas phase (captured particles) may include substances or mixtures of substances that settle out and/or form agglomerates that can partially or fully block passages within the fluid scrubbing equipment. Periodic cleaning of fluid scrubber systems is required to offset the deleterious effects of built-up deposits of precipitates, captured particles and agglomerates. Also, because the maximum percentage of suspended solids in scrubbing liquids are limited by inherent constraints in the design parameters for spray tower, packed tower and venturi types of fluid scrubbers, the required rates of blow down in these fluid scrubbers can add significantly to the operating costs. While increased rates of blow down favor lower percentages of total solids, for a given fluid scrubber application, operating costs will rise with the blow down rate due to increases in: 1) the volume of blow down to be managed; 2) the consumption of fresh scrubbing liquid (make up) and; 3) the amounts of any reagents or other additives that have to be added to scrubbing liquid to overcome losses within the blow down.

Like most fluid scrubbers, submerged gas reactors/evaporators (hereinafter "submerged gas reactors") generally mix liquids and gasses. However, unlike most conventional fluid scrubbers, within submerged gas reactors a discontinuous gas phase is dispersed within a continuous liquid phase. Submerged gas reactors are used in many industries to perform chemical reaction, processes with respect to various constituents. U.S. Pat. No. 5,342,482, which is hereby incorporated by reference, discloses a common type of submerged gas reactor in which combustion gas is generated and delivered though an inlet pipe to a dispersal unit submerged within the liquid to be reacted. The dispersal unit includes a number of spaced-apart gas delivery pipes extending radially outward from the inlet pipe, each of the gas delivery pipes having small holes spaced apart at various locations on the surface of the gas delivery pipe to disperse the combustion gas as small bubbles as uniformly as practical across the cross-sectional area of the liquid held within a processing vessel. According to current understanding within the prior art, this design provides desirable intimate contact between the liquid and the combustion gas over a large interfacial surface area while also promoting thorough agitation of the liquid within the processing vessel.

The design features of submerged gas reactors offset many of the drawbacks of conventional fluid scrubbers. For example, by dispersing the gas into a continuous liquid phase problems associated with removing entrained liquid droplets from the gas stream are greatly reduced compared to spray tower, packed tower and venturi type fluid scrubbers. Likewise, because submerged gas reactors do not rely on extended surfaces with critical void space requirements as exist in packed tower fluid scrubber designs, the potential to foul extended surfaces and block void space is eliminated. Also, because the gas phase flowing through a submerged gas reactor is dispersed as a discontinuous phase within a continuous liquid phase, for a given ratio of gas to liquid at a set pressure, the required volume of the gas-liquid contact zone is the minimum possible and generally a much smaller volume than that required in conventional spray tower and packed tower fluid scrubbers, thus favoring more compact designs compared to spray tower and packed tower scrubbers. Additionally, because submerged gas reactors do not rely on dispersing fine droplets of liquid into a continuous gas phase, demisters employed for separating entrained liquid droplets from the gas phase within submerged gas reactors typically consume significantly less energy than the demister sections required for venturi fluid scrubbers and somewhat less energy than demisters used in spray tower and packed tower fluid scrubbers. Further, because dispersing the gas into the liquid phase creates significant mixing action within the reaction vessel of submerged gas reactors the tendencies for particles to settle out of suspension and cause blockages are less than those within spray tower, packed tower and venturi type fluid scrubbers. Additionally, in combination with this mixing action, because a fixed volume of the liquid undergoing processing is always maintained within the submerged gas reactor vessel, the submerged gas reactor does not require a separate sump and mixer.

However, mitigation of crystal growth and settlement or agglomeration of suspended solids is dependent on the degree of mixing achieved within a particular submerged gas reactor, and not all submerged gas reactor designs provide adequate mixing to prevent settlement of solid particles and related blockages. For instance, settlement and agglomeration of solid particles can block critical passages within processing equipment such as the gas exit holes in the system described in U.S. Pat. No. 5,342,482. Liquid streams that cause deposits to form on surfaces and create blockages within process equipment are called fouling fluids.

Direct contact between hot gas and liquid undergoing processing within a submerged gas reactor provides excellent heat transfer efficiency. If the residence time of the gas within the liquid is adequate for the gas and liquid temperatures to reach equilibrium, a submerged gas processor operates at a very high level of overall energy efficiency. For example, when hot gas is dispersed in a liquid that is at a lower temperature than the gas and the resilience time is adequate to allow the gas and liquid temperatures to reach equilibrium at the adiabatic saturation temperature for the system, all of the available driving forces to affect mass and heat transfer, and allow chemical and physical changes to proceed to equilibrium stages, will have been consumed within the process. The minimum residence time to attain equilibrium of gas and liquid temperatures within the evaporation, reaction or combined reaction/evaporation zone of a submerged gas reactor is a function of factors that include, but are not limited to, the temperature differential between the hot gas and liquid, the properties of the gas and liquid phase components, the properties of the resultant gas-liquid mixture, the net heat absorbed or released through any chemical reactions and the extent of interfacial surface area generated as the hot gas is dispersed into the liquid.

Given a fixed set of values for temperature differential, properties of the gas and the liquid components, properties of the gas-liquid mixture, heats of reaction and the extent of the interfacial surface area, the residence time of the gas is a function of factors that include the difference in specific gravity between the gas and liquid or buoyancy factor, and other forces that affect the vertical rate of rise of the gas through the liquid phase including the viscosity and surface tension of the liquid. Additionally, the flow pattern of the liquid including any mixing action imparted to the liquid such as that created by the means chosen to disperse the gas within the liquid affect the rate of gas disengagement from the liquid.

Submerged gas reactors may be built in various configurations. One common type of submerged gas reactor is the submerged combustion gas reactor that generally employs a pressurized burner mounted to a gas inlet tube that serves as both a combustion chamber and as a conduit to direct the combustion gas to a dispersion system located beneath the surface of liquid held within a reaction vessel. The pressurized burner may be fired by any combination of conventional liquid or gaseous fuels such as natural gas, oil or propane, any combination of non-conventional gaseous or liquid fuels such as biogas or residual oil, or any combination of conventional and non-conventional fuels.

Other types of submerged gas reactors include hot gas reactors where hot gas is either injected under pressure or drawn by an induced pressure drop through a dispersion system located beneath the surface of liquid held within a reaction vessel. While hot gas reactors may utilize combustion gas such as hot gas from the exhaust stacks of combustion processes, gases other than combustion gases or mixtures of combustion gases and other gases may be employed as desired to suit the needs of a particular reaction process. Thus, waste heat in the form of hot gas produced in reciprocating engines, turbines, boilers or flare stacks may be used within hot gas reactors. In other forms, hot gas reactors may be configured to utilize specific gases or mixtures of gases that are desirable for a particular process such as air, carbon, dioxide or nitrogen that are heated within heat exchangers prior to being injected into or drawn through the liquid contained within a reaction vessel.

Regardless of the type of submerged gas reactor or the source of the gas used within a reactor, in order for the process to continuously perform effectively, reliably and efficiently, the design of the submerged gas reactor must include provisions for efficient heat and mass transfer between gas and liquid phases, control of entrained liquid droplets within the exhaust gas, mitigating the formation of large crystals or agglomerates of particles and maintaining the mixture of solids and liquids within the submerged gas reaction vessel in a homogeneous state to prevent settling of suspended particles.

SUMMARY OF THE DISCLOSURE

A simple and efficient fluid scrubber includes a reaction vessel, one or more tubes at least partially disposed within the reaction vessel, which are adapted to transport a gas into the interior of the reaction vessel. The reaction vessel has a fluid inlet that transports a scrubbing liquid, which may be a sorbent or reagent, into the reaction vessel at a rate that maintains the scrubbing liquid inside the reaction vessel at a predetermined level and an exhaust stack that allows gas to flow away from the reaction vessel. In addition, the fluid scrubber includes one or more weirs disposed within the reaction vessel. The weir(s) may at least partially surround the tube(s) and may be at least partially submerged in the scrubbing liquid to create a fluid circulation path formed by the space between each weir, or each weir and a wall surface of the reaction vessel, and the tube(s). In one embodiment, each weir is open at both ends and forms a lower circulation gap between a first one of the weir ends and a bottom wall of the reaction vessel and an upper circulation gap between a second one of the weir ends and a surface of the scrubbing liquid.

During operation, polluted gas introduced through each tube mixes with the scrubbing liquid in a first confined volume formed by each weir, or each weir and walls of the vessel, and the tube(s), and the mixture of gas and liquid flows at high volume with a high degree of turbulence along the circulation path defined around each weir, thereby causing a high degree of mixing between the gas and the scrubbing liquid and any suspended particles within the scrubbing liquid. Shear forces within this two-phase or three-phase turbulent flow that result from the high density liquid phase overrunning the low density gas phase create extensive interfacial surface area between the gas and the scrubbing liquid that favors minimum residence time for mass and heat transfer between the liquid and gas phases to come to equilibrium compared to conventional gas dispersion techniques. Thus pollutants such as sulfur trioxide that might be present in the gas stream can be efficiently transferred to the scrubbing liquid, which might be water, in which case the sulfur trioxide would react with the water to form sulfuric acid, which would remain sequestered in the water. Also, vigorous mixing created by the turbulent flow hinders the formation of large crystals or precipitates within the scrubbing liquid and, because the system does not use small holes or other ports to introduce the gas into the scrubbing liquid, clogging and fouling associated with submerged gas reactors are significantly reduced or entirely eliminated. Further, the predominantly horizontal flow direction of the liquid and gas mixture over the top of the weir and along the surface of the scrubbing liquid within the reaction vessel enables the gas phase to disengage from the scrubbing liquid with minimal entrainment of liquid due to the significantly greater momentum of the much higher density liquid that is directed primarily horizontally compared to the low density gas with a relatively weak but constant vertical momentum component due to buoyancy.

In addition, a method of processing polluted gas using a fluid scrubber includes providing a scrubbing liquid to a reaction vessel at a rate sufficient to maintain the scrubbing liquid level at a predetermined level within the reaction vessel, supplying a polluted gas to the reaction vessel, adding a reagent to the scrubbing liquid to selectively react with a target pollutant in the gas and mixing the polluted gas and scrubbing liquid within the reaction vessel by causing the polluted gas and scrubbing liquid to flow around a weir within the fluid scrubber to thereby facilitate both transfer of the target pollutant to the scrubbing liquid and cause a desirable chemical reaction between the target pollutant and the selected reagent in order to render the target pollutant less noxious. For example, by adding caustic (e.g., sodium hydroxide) to the scrubber fluid to react with sulfur trioxide, in this case the target pollutant in the gas stream, the caustic readily reacts with the sulfur trioxide to form a sulfate, for example sodium sulfate, and sequester the sulfate within the scrubber liquid as a dissolved solid.

DETAILED DESCRIPTION

The performance of fluid scrubbers according to the disclosure depends on the properties of the pollutant(s) to be removed from the gas feed stream, the properties of the scrubbing liquid and the temperature and humidity of the gas feed stream. Usually, the gas feed stream is contaminated industrial exhaust. One skilled in the art will readily recognize that the advantages of fluid scrubbers according to the disclosure may be realized by substituting such fluid scrubbers for conventional fluid scrubbers in almost any fluid scrubbing application. Wherever fluid scrubbers according to the disclosure are employed, conventional means may be employed to control the flow of contaminated gas and scrubbing liquid through the fluid scrubber and, if required, to post-treat the liquid and/or gas streams. Likewise, most other conventional means of controlling fluid scrubbing systems to meet the requirements of a particular application may be employed. It will also be readily recognized that multiple fluid scrubbers according to the invention may be connected in series or parallel configurations to meet the fluid scrubbing demand of a particular application.

Figure 1:
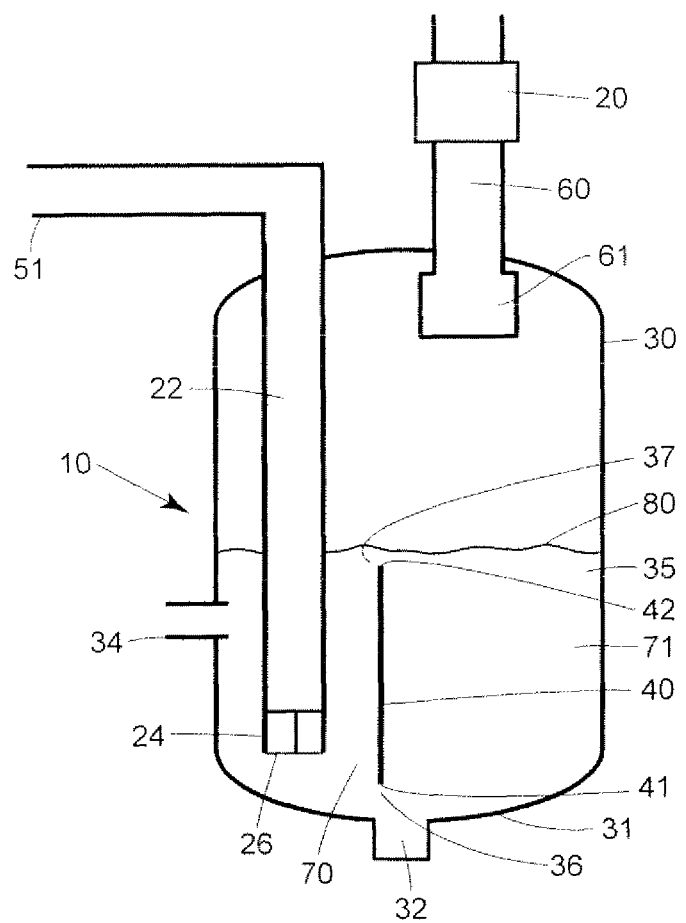
FIG. 1 is a cross-sectional view of a fluid scrubber in accordance with the teachings of the disclosure.

Referring to FIG. 1, a fluid scrubber 10, in the form of a submerged gas reactor, includes a gas supply tube or gas inlet tube 22 having sparge or gas exit ports 24 at or near an end 26 thereof The gas inlet tube 22 is disposed within a reactor vessel 30 having a bottom wall 31 and a scrubbing liquid outlet port 32. A scrubbing liquid inlet port 34 is disposed in one side of the reactor vessel 30 and enables a scrubbing liquid 35 (and other liquids) to be provided into the interior of the reactor vessel 30. Additionally, a weir 40, which is illustrated in FIG. 1 as a flat or solid plate member having a first or lower end 41 and a second or upper end 42, is disposed within the reactor vessel 30 adjacent the gas inlet tube 22. The weir 40 defines and separates two volumes 70 and 71 within the reactor vessel 30. As illustrated in FIG. 1, a gas exit port 60, disposed in the top of the reaction vessel 30, enables gas to exit from the interior of the reaction vessel 30. A blower 20 (in this case an induction fan) is disposed on the gas exit port 60 in this embodiment, thus providing gas to the reaction vessel 30. Disposed at or near a junction of the gas exit port 60 and the reaction vessel 30 is a demister 61. The demister 61 removes droplets of scrubbing liquid that are entrained in the gas phase as the gas disengages from the liquid phase at a surface 80 of the scrubbing liquid. The demister 61 may be a vane-type demister, a mesh pad-type demister, or any combination of commercially available demister elements. Further, a vane-type demister may be provided having a coalescing filter to improve demisting performance. The demister 61 may be mounted in any orientation and adapted to a particular vessel 30 including, but not limited to, horizontal and vertical orientations.

In the fluid scrubber of FIG. 1, the blower 20 provides polluted gas to the vessel 30 by drawing the gas from a source (not shown) through a line 51, the gas inlet tube 22 and the gas exit ports 24 into the interior of vessel 30. However, a blower disposed on the inlet gas side of the system (FIG. 2) could be used to deliver the polluted gas under pressure into the interior of reaction vessel 30 instead of drawing the polluted gas into the reaction vessel 30 with the induction fan/blower 20. Moreover, the scrubbing liquid 35 may be supplied through the scrubbing liquid inlet 34 by a pump (not shown in FIG. 1) at a rate sufficient to maintain the surface 80 of the scrubbing liquid 35 within the reactor vessel 30 at a predetermined level, which may be set by a user. A level sensor and control (not shown in FIG. 1) may be used to determine and control the rate that the scrubbing liquid 35 is supplied through the inlet port 34.

As illustrated in FIG. 1, the weir 40 is mounted within the reaction vessel 30 to form a lower circulation gap 36 between the first end 41 of the weir 40 and the bottom wall 31 of the reaction vessel 30 and to form an upper circulation gap 37 between the second end 42 of the weir 40 and the surface 80 of the scrubbing liquid 35 (or the top wall of the reaction vessel 30). As will be understood, the upper end 42 of the weir 40 is preferably set to be at or below the surface 80 of the scrubbing liquid 35 when the scrubbing liquid 35 is at rest (i.e., when no gas is being introduced into the reaction vessel via the gas inlet tube 22). In some situations, it may be possible to set the upper end 42 of the weir 40 slightly above the at rest level of the scrubbing liquid 35, as long as introduction of the gas via the gas inlet tube 22 causes scrubbing liquid to flow over the upper end 42 of the weir 40. In any event, as illustrated in FIG. 1, the weir 40 also defines and separates the confined volume or space 70 in which the sparge ports 24 are located from the volume or space 71. If desired, the weir 40 may be mounted to the reaction vessel 30 via welding, bolts or other fasteners attached to internal side walls of the reaction vessel 30.

During operation, a polluted gas is induced to flow under negative pressure created by the blower 20 into and through the gas inlet tube 22 before reaching the sparge or exit ports 24. The gas exits the gas inlet tube 22 through the sparge ports 24 into the confined volume 70 formed between, the weir 40 and the gas inlet tube 22, causing the gas to be dispersed into the continuous liquid phase of the scrubbing liquid within the reaction vessel 30. Generally speaking, gas exiting from the sparge ports 24 mixes with the liquid phase of the scrubbing liquid within the confined volume 70 and causes a high volume flow pattern to develop around the weir 40. The velocity of the flow pattern and hence the turbulence associated with the flow pattern is highest within the confined volume 70 and at the locations where the liquid flows through the upper gap 37 and the lower gap 36 of the weir 40. The turbulence within the confined volume 70 significantly enhances the dispersion of the gas into the scrubbing liquid which, in turn, provides for efficient heat and mass transfer between the gas and the scrubbing liquid. In particular, after exiting the sparge ports 24, the gas is dispersed as a discontinuous phase into a continuous liquid phase of the scrubbing liquid forming a gas/liquid mixture within the confined volume 70. The mass per unit volume of the gas/liquid mixture in the confined volume 70 is significantly less than the average mass per unit volume of the mixture of gas and scrubbing liquid in the volume 71. Due to this large difference in mass per unit volume of the liquid compared to the gas, typically on the order of approximately 1000 to 1, a difference in static hydraulic pressure is formed between the gas/liquid mixture in the confined volume 70 and the liquid phase in the volume 71 at all elevations. This imbalance in static hydraulic pressure forces the scrubbing liquid to flow from the higher pressure region, i.e., the volume 71, to the lower pressure region, i.e., the confined volume 70, at a rate that overcomes the impressed static hydraulic pressure imbalance and creates flow upward through the confined volume 70.

Put another way, the dispersion of gas into the scrubbing liquid 35 within the confined volume 70 at the sparge ports 24 develops a continuous flow pattern that draws scrubbing liquid 35 under the bottom edge 41 of the weir 40 through the lower circulation gap 36, and causes the mixture of gas and scrubbing liquid 35 to move through the confined volume 70 and toward the surface 80 of the scrubbing liquid 35. Near the surface 80, the gas/liquid mixture reaches a point of balance at which the imbalance of static hydraulic pressure is eliminated. Generally speaking, this point is at or near the upper circulation gap 37 formed between the second end 42 of the weir 40 and the s surface 80. At the balance point, the force of gravity, which becomes the primary outside force acting on the gas/fluid mixture, gradually eliminates most of the vertical momentum component of the gas/liquid mixture. This reduced vertical momentum, in turn, causes the gas/liquid mixture to flow in a predominantly horizontal direction over the second end 42 of the weir 40 (through the circulation gap 37 defined at or near the surface 80 of the scrubbing liquid 35) and into the liquid phase of the scrubbing liquid 35 within the volume 71.

This flow pattern around the weir 40 affects the dispersion of the gas into the continuous liquid phase of the scrubbing liquid 35 and, in particular, thoroughly agitates the continuous liquid phase of the scrubbing liquid 35 within the reaction vessel 30 while creating a substantially horizontal flow pattern of the gas/liquid mixture at or near the surface 80 of the continuous liquid phase of the scrubbing liquid 35. This horizontal flow pattern significantly mitigates the potential for entrained liquid droplets to be carried vertically upward along with the dispersed gas phase as the dispersed gas phase rises through the liquid phase due to buoyancy and finally disengages front the continuous liquid phase of the scrubbing liquid at the surface 80.

Also, the mixing action created by the induced flow of liquid and liquid/gas mixtures within both the confined volume 70 and the volume 71 hinders the formation of large crystals of precipitates, which generally requires a quiescent environment. By selectively favoring the production of relatively small particles of precipitates, the mixing action within reaction vessel 30 helps to ensure that suspended particles formed in the fluid scrubbing process may be maintained in suspension within the liquid phase circulating around the weir 40, which effectively mitigates the formation of blockages and fouling within the fluid scrubber. Likewise, because only relatively small particles that are readily maintained in suspension are formed through precipitation, the efficiency of the fluid scrubber is improved over known fluid scrubbing systems in terms of freedom from clogging and fouling.

In addition, as the circulating liquid phase within volume 71 approaches the bottom wall 31 of the reaction vessel 30, the liquid phase is forced to flow in a predominantly horizontal direction and through the lower gap 36 into the confined volume 70. This predominantly horizontal flow pattern near the bottom wall 31 of the reaction vessel 30 creates a scouring action at and above the interior surface of the bottom wall 31 which maintains particles of solids including precipitates in suspension within the circulating liquid while the fluid scrubber is operating. The scouring action at and near the bottom wall 31 of the reaction vessel 30 also provides means to re-suspend settled particles of solids whenever the fluid scrubber is re-started after having been shutdown for a period of time sufficient to allow suspended particles to settle on or near the bottom wall 31.

As is known, fluid scrubbing is a process that affects mass transfer of pollutants from a polluted gas stream and sequesters the pollutant within a scrubbing liquid by causing the polluted gas and scrubbing liquid to be brought into intimate contact for a finite period of time. As desirable for a particular application, the scrubbing liquid, which can be a solution or slurry, may contain one or more reagents that react chemically with one or more of targeted pollutants within gas. Through appropriate chemical reactions, targeted pollutants can frequently be turned into less noxious compounds, and these less noxious compounds remain sequestered within the scrubbing liquid. Within a fluid scrubber configured as a submerged gas reactor, heat and mass transfer and chemical reactions occur simultaneously at the interface formed by the dynamic boundaries of the discontinuous gas and continuous liquid phases. The system shown in FIG. 1 integrates the functions of dispersing the gas into the liquid phase, providing thorough agitation of the liquid phase, and mitigating entrainment of liquid droplets with the gas phase as the gas disengages from the liquid. Additionally, the turbulence and mixing that occurs within the reaction vessel 30 due to the flow pattern created by dispersion of gas into liquid within the confined volume 70 reduces the formation of large crystals of precipitates and/or large agglomerates of smaller particles within the reaction vessel 30.

Figure 2:
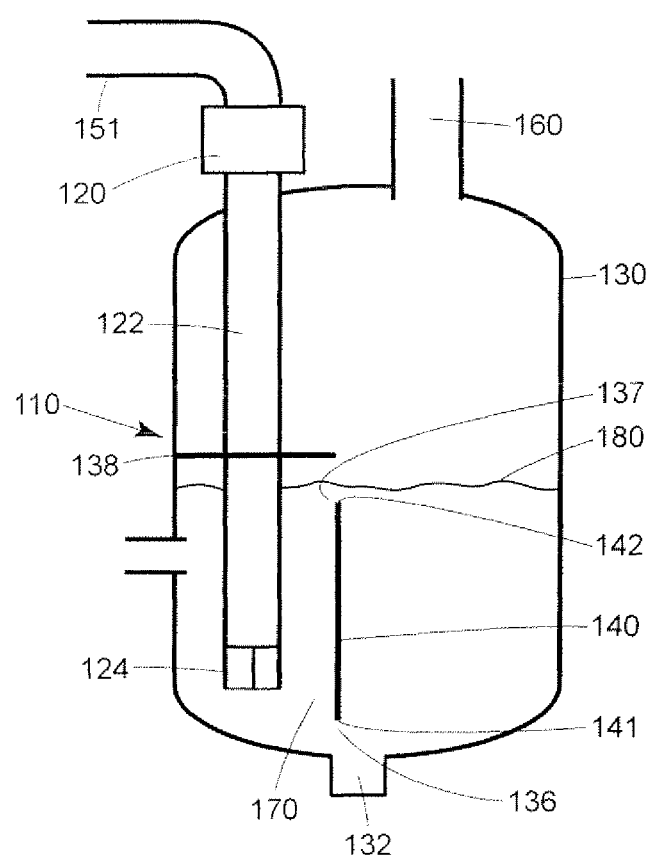
FIG. 2 is a cross-sectional view of a second fluid scrubber including a baffle.

FIG. 2 illustrates a second embodiment of a fluid scrubber 110, which is very similar to the fluid scrubber 10 of FIG. 1 and in which elements shown in FIG. 2 are assigned reference numbers being exactly 100 greater than the corresponding elements of FIG. 1. Unlike the device of FIG. 1, the fluid scrubber 110 includes a baffle or a shield 138 disposed within the reaction vessel 130 at a location slightly above or slightly below the scrubbing liquid surface 180 and above the second end 142 of the weir 140. The baffle or shield 138 may be shaped and sized to conform generally to the horizontal cross-sectional area of the confined volume 170. Additionally, if desired, the baffle 138 may be mounted to any of the gas inlet tube 122, the reaction vessel 130 or the weir 140. The baffle 138 augments the force of gravity near the balance point by presenting a physical barrier that abruptly and positively eliminates the vertical components of velocity and hence, momentum, of the gas/liquid mixture, thereby assisting the mixture to flow horizontally outward and over the weir 140 at the upper circulation gap 137. The baffle enhances the mitigation of entrained liquid droplets within the gas phase as the gas disengages from the liquid phase. Furthermore, a blower 120 (in this case a pressure blower) is disposed on the gas inlet tube 122 in this embodiment, thus providing polluted gas to the reaction vessel 130 under positive pressure.

As will be understood, the weirs 40 and 140 of FIGS. 1 and 2 may be generally flat, plates or may be curved plates that extend across the interior of the reaction vessel 30 between different, such as opposite, sides of the reaction vessel 30. Basically, the weirs 40 and 140 create a barrier within the reaction vessel 30 and 130 defining and separating the volumes 70 and 71 (and 170 and 171). While the weirs 40 and 140 are preferably solid in nature they may, in some cases, be perforated, for instance, with slots or holes to modify the flow pattern within the reaction vessel 30 or 130, or to attain a particular desired mixing result within the volume 71 or 171 while still providing a substantial barrier between the volumes 70 and 71 or 170 and 171. Additionally, while the weirs 40 and 140 preferably extend across the reaction vessels 30 and 130 between opposite walls of the reaction vessels 30 and 130, they may be formed into any desired shape so long as a substantial barrier is formed to isolate one volume 70 (or 170) closest to the gas inlet tube 22 from the volume 71 (or 171) on the opposite side of the weir 40, 140.

Figure 3:
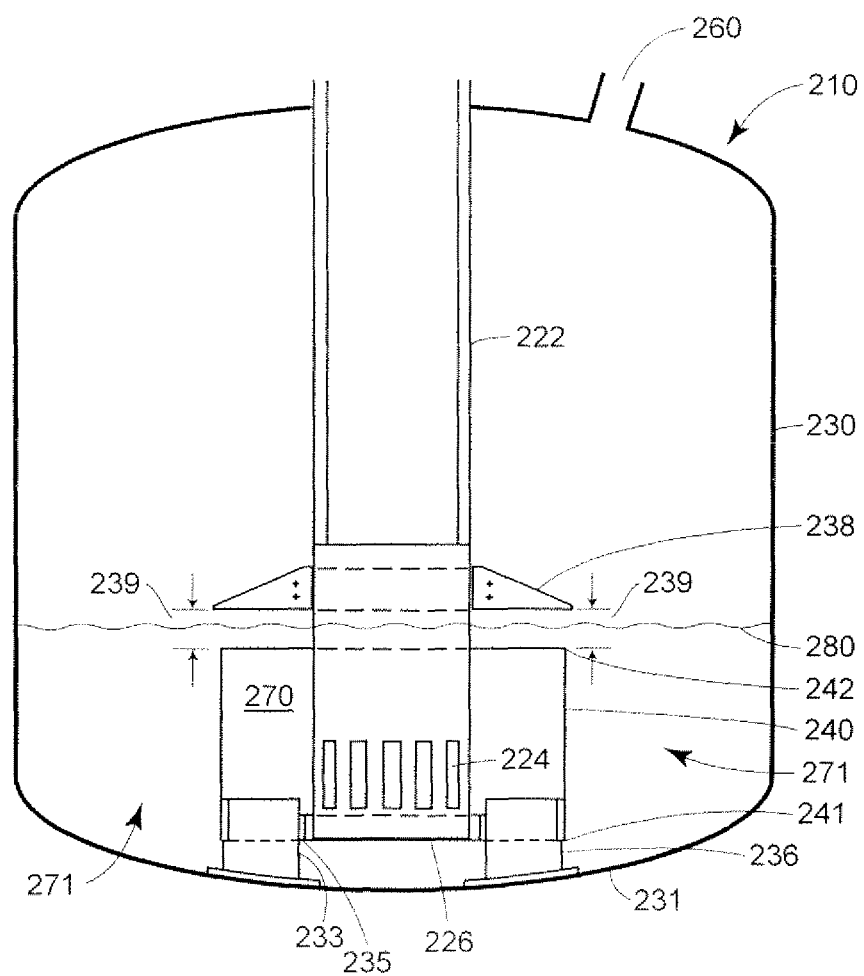
FIG. 3 is a cross-sectional view of a third fluid scrubber having a tubular shaped weir.

FIG. 3 illustrates a cross-sectional view of a further fluid scrubber 210 having a weir 240 that extends around a gas inlet tube 222. A combustion process in close proximity to the fluid scrubber 210 delivers approximately 3,500 standard cubic feet per minute (scfm) of polluted combustion gas at 1,400° F. or approximately 12,300 actual cubic feet per minute (acfm) to the gas inlet tube 222. While the dimensions of the fluid scrubber 210 are exemplary only, the ratios between these dimensions may serve as a guide for those skilled in the art to achieve a desirable balance between three desirable process results including: 1) preventing the formation of large crystals of precipitates and/or agglomerates of solid particles while maintaining solid particles as a homogeneous suspension within the scrubbing liquid by controlling the degree of overall mixing within reaction vessel 230; 2) enhancing the rates of heat and mass transfer and desirable chemical reactions by controlling the turbulence and hence interfacial surface area created between the gas and liquid phases within confined volume 270; and 3) mitigating the potential of entraining liquid droplets in the gas as the gas stream disengages from the liquid phase at the scrubbing liquid surface 280 by maintaining a desirable and predominately horizontal velocity component for the gas/liquid mixture flowing outward over the second end 242 of the weir 240 and along the surface 280 within reaction vessel 230. As illustrated in FIG. 3, the fluid scrubber 210 includes a reaction vessel 230 with a dished bottom having an interior volume and a vertical gas inlet tube 222 at least partially disposed within the interior volume of the reaction vessel 230. In this case, the gas inlet tube 222 has a diameter of approximately 20 inches and the overall diameter of the reaction vessel 230 is approximately 120 inches, but these diameters may be more or less based on the design capacity and desired process result as relates to both gas and liquid flow rates and the type of combustion device (not shown in FIG. 3) supplying gas to the fluid scrubber. In this example the weir 240 has a diameter of approximately 40 inches with vertical walls approximately 26 inches in length. Thus, the weir 240 forms an annular confined volume 270 within reaction vessel 230 between the inner wall of the weir 240 and the outer wall of the gas inlet tube 222 of approximately 6.54 cubic feet. In the embodiment of FIG. 3, twelve sparge ports 224 are disposed near the bottom of the gas inlet tube 222. The sparge ports 224 are substantially rectangular in shape and are, in this example, each approximately 3 inches wide by 7¼ inches high or approximately 0.151 ft$^2$ in area for a combined total area of approximately 1.81 ft$^2$ for all twelve sparge ports 224. Thus, in this example the ratio of gas flow per unit sparge port area is approximately 6,800 acfm per ft$^2$ at the hot gas operating temperature within the gas inlet tube 222, in this case 1,400° F. Additionally, the sparge ports 224 are arranged generally parallel to the flow direction of the gas/liquid phase, further reducing the possibility of the sparge ports 224 becoming blocked.

As will be understood, the combustion gas exits the gas inlet tube 222 through the sparge ports 224 into a confined volume 270 formed between the gas inlet tube 222 and a tubular shaped weir 240. In this case, the weir 240 has a circular cross-sectional shape and encircles the lower end of the gas inlet tube 222. Additionally, the weir 240 is located at an elevation which creates a lower circulation gap 236 of approximately 4 inches between a first end 241 of the weir 240 and a bottom dished surface 231 of the reaction vessel 230. The second end 242 of the weir 240 is located at an elevation below a normal or at rest operating level of the scrubbing liquid within the reaction vessel 230. Further, a baffle or shield 238 is disposed within the reaction vessel 230 approximately 8 inches above the second end 242 of the weir 240. The baffle 238 is circular in shape and extends radially outwardly from the gas inlet tube 222. Additionally, the baffle 238 is illustrated as having an outer diameter somewhat greater than the outer diameter of the weir 240 which, in this case, is approximately 46 inches. However, the baffle 238 may have the same, a greater or smaller diameter than the diameter of the weir 240 if desired. Several support brackets 253 are mounted to the bottom surface 231 of die reaction vessel 230 and are attached to the weir 240 near the first end 241 of the weir 240. Additionally, a gas inlet tube stabilizer ring 235 is attached to the support brackets 233 and substantially surrounds the bottom end 226 of the gas inlet tube 222 to stabilize the gas inlet tube 222 during operation.

During operation of the fluid scrubber 210, the gases are ejected through the sparge ports 224 into the confined volume 270 between the gas inlet tube 222 and the weir 242 creating a mixture of gas and liquid within the confined volume 270 that is significantly reduced in bulk density compared to the average bulk density of the fluid located in the volume 271 outside of the weir 240. This reduction in bulk density of the gas/liquid mixture within confined volume 270 creates an imbalance in head pressure at all elevations within the vertical extent of the weir between the surface 280 within the reaction vessel 230 and the first end 241 of the weir 240 when comparing the head pressure within the confined volume 270 and head pressure within the volume 271 outside of the wall of the weir 240 at equal elevations. The reduced head pressure within the confined volume 270 induces a flow pattern of liquid from the higher head pressure regions of volume 271 through the circulation gap 236 and into the confined volume 270. Once established, this induced flow pattern provides vigorous mixing action both within the confined volume 270 and throughout the volume 271 as liquid from the surface 280 and all locations within the volume 271 is drawn downward through the circulation gap 236 and upward due to buoyancy through the confined volume 270 where the gas/liquid mixture flows outward over the second end 242 of the weir 240 and over the surface 280.

Within confined volume 270, the induced flow pattern and resultant vigorous mixing action creates significant shearing forces that are primarily based on the difference in specific gravity and hence momentum vectors between the liquid and gas phases at all points on the interfacial surface area of the liquid and gas phases. The shearing forces driven by the significant difference in specific gravity between the liquid and gas phases, which is, generally speaking, of a magnitude of 1000:1 liquid to gas, cause the interfacial surface area between the gas and liquid phases to increase significantly as the average volume of each discrete gas region within the mixture becomes smaller and smaller due to the shearing force of the flowing liquid phase. Thus, as a result of the induced flow pattern and the associated vigorous mixing within the confined area 270, the total inlet/facial surface area, increases as the gas/liquid mixture flows upward within confined volume 270. This increase in interfacial surface area or total contact area between the gas and liquid phases favors increased rates of heat and mass transfer and chemical reactions between constituents of the gas and liquid phases as the gas/liquid mixture flows upward within confined volume 270 and outward over the second end 242 of the weir 240.

At the point where gas/liquid mixture flowing upward within confined volume 270 reaches the elevation of the surface 280 and having passed beyond the second edge 242 of the weir 240, the difference in head pressure between the gas/liquid mixture within the confined volume 270 and the liquid within volume 271 is eliminated. Absent the driving force of differential head pressure and the confining effect of the wall of the weir 240, gravity and the resultant buoyancy of the gas phase within the liquid phase become the primary outside forces affecting the continuing flow patterns of the gas/liquid mixture exiting the confined space 270. The combination of the force of gravity and the barrier created by the baffle 238 in the vertical direction eliminates the vertical velocity and momentum components of the flowing gas/liquid mixture at or below the elevation of the bottom of the baffle 238 and causes the velocity and momentum vectors of the flowing gas/liquid mixture to be directed outward through the gap 239 created by the second end 242 of the weir 240 and the bottom surface of the baffle 238 and downwards near the surface 280 within the reaction vessel 230 causing the continuing flow pattern of the gas/liquid mixture to assume a predominantly horizontal direction. As the gas/liquid mixture flows outwards in a predominantly horizontal direction, the horizontal velocity component continually decreases causing a continual reduction in momentum and a reduction of the resultant shearing forces acting at the interfacial area within the gas/liquid mixture. The reduction in momentum and resultant shearing forces allows the force of buoyancy to become the primary driving force directing the movement of the discontinuous gas regions within the gas/liquid mixture, which causes discrete and discontinuous regions of gas to coalesce while ascending vertically within the continuous liquid phase. As the ascending gas regions within the gas/liquid mixture reach the surface 280 within the reaction vessel 230, buoyancy causes the discontinuous gas phase to break through the surface 280 and to coalesce into a continuous gas phase that is directed upward within the confines of the reaction vessel 230 and into the gas exit port 260 under the influence of the differential pressure created by the blower or blowers (not shown in FIG. 3) supplying gas to the fluid scrubber 210.

Figure 4:
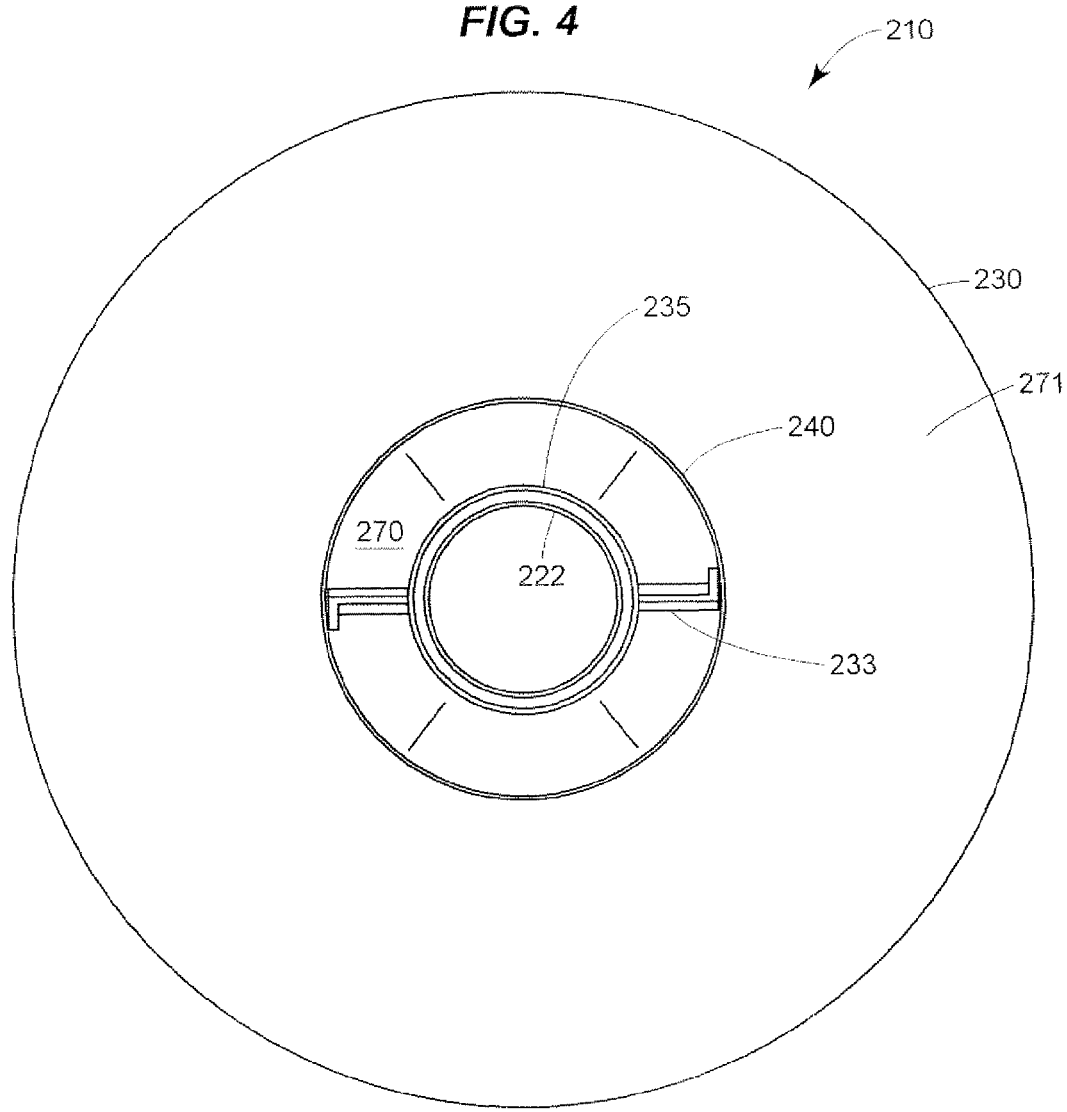
FIG. 4 is a top plan view of the fluid scrubber of FIG. 3.

FIG. 4 is a top plan view of the fluid scrubber 210 of FIG. 3 illustrating the tubular nature of the weir 240. Specifically, the generally circular gas inlet tube 222 is centrally located and is surrounded by the stabilizer ring 235. In this embodiment, the stabilizer ring 235 surrounds the gas inlet tube 222 and essentially restricts any significant lateral movement of the gas inlet tube 222 due to surging or vibration such as might occur upon startup of the system. While the stabilizer ring 235 of FIG. 4 is attached to the support brackets 233 at two locations, more or fewer support brackets 233 may be employed without affecting the function of the fluid scrubber 210. The weir 240, which surrounds the gas inlet tube 222 and the stabilizer ring 235, and is disposed co-axially to the gas inlet tube 222 and the stabilizer ring 235, is also attached to, and is supported by the support brackets 233. In this embodiment, the confined volume 270 is formed between the weir 240 and the gas inlet tube 222 while the second volume 271 is formed between the weir 240 and the side walls of the reaction vessel 230. As will be understood, in this embodiment, the introduction of the gas from the exit ports 224 of the gas inlet tube 220 causes scrubbing liquid to flow in an essentially toroidal pattern around the weir 240.

Some design factors relating to the design of the fluid scrubber 210 illustrated in FIGS. 3 and 4 are summarized below and may be useful in designing larger or smaller fluid scrubbers. The shape of the cross sectional area and length of the gas inlet tube is generally set by the allowable pressure drop, the configuration of the reaction vessel, and the costs of forming suitable material to match the desired cross sectional area, and, importantly, if direct fired, the characteristics of the burner that is coupled to the fluid scrubber. However, it is desirable that the outer wall of the gas inlet tube 222 provides adequate surface area for openings of the desired shape and size of the sparge ports which in turn admit the gas to the confined volume 271. For a typical fluid scrubber, the vertical distance between the top edge 242 of the weir 240 and the top edge of the sparge ports should be not less than about 6 inches and preferably is at least about 17 inches. Selecting the shape and, more particularly, the size of the sparge port 224 openings is a balance between allowable pressure drop and the initial amount of interfacial area created at the point where the gas is dispersed into the flowing liquid phase within confined volume 271. The open area of the sparge ports 224 is generally more important than the shape, which can be most any configuration including, but not limited to, rectangular, trapezoidal, triangular, round, oval. In general, the open area of the sparge ports 224 should be such that the ratio of gas flow to total combined open area of all sparge ports should at least be in the range of 1,000 to 18,000 acfm per $ft^2$, preferably in the range of 2,000 to 10,000 acfm/$ft^2$ and more preferably in the range of 2,000 to 8,000 acfm/$ft^2$, where acfm is referenced to the operating temperature within the gas inlet tube. Likewise, the ratio of the gas flow to the cross sectional area of the confined volume 270 ($CSA_{confined\ volume}$) should be at least in the range of 400 to 10,000 scfm/$ft^2$, preferably in the range of 500 to 4,000 scfm/$ft^2$ and more preferably in the range of 500 to 2,000 scfm/$ft^2$. Additionally, the ratio of the cross sectional area of the reaction vessel 230 ($CSA_{vessel}$) to the cross sectional area of the confined volume 270 is preferably in the range from three to one (3.0:1) to two-hundred to one (200:1), is more preferably in the range from eight to one (8.0:1) to one-hundred to one (100:1) and is highly preferably in the range of about ten to one (10:1) to fourteen to one (14:1). These ratios are summarized in the table below. Of course, in some circumstances, other ratios for these design criteria could be used as well or instead of those particularly described herein.

TABLE 1

| Ratios | Preferred Embodiment | Acceptable Range | Preferred Range |
|---|---|---|---|
| acfm per Total $CSA_{sparge\ ports}$ | 2,000-8,000 acfm/$ft^2$ | 1,000-18,000 acfm/$ft^2$ | 2,000-10,000 acfm/$ft^2$ |
| Scfm per $CSA_{confined\ volume}$ | 500-2,000 scfm/$ft^2$ | 400-10,000 scfm/$ft^2$ | 500-4,000 scfm/$ft^2$ |
| $CSA_{vessel}$/$CSA_{confined\ volume}$ | 10:1-14:1 | 3.0:1-200:1 | 8.0:1-100:1 |

Figure 5:
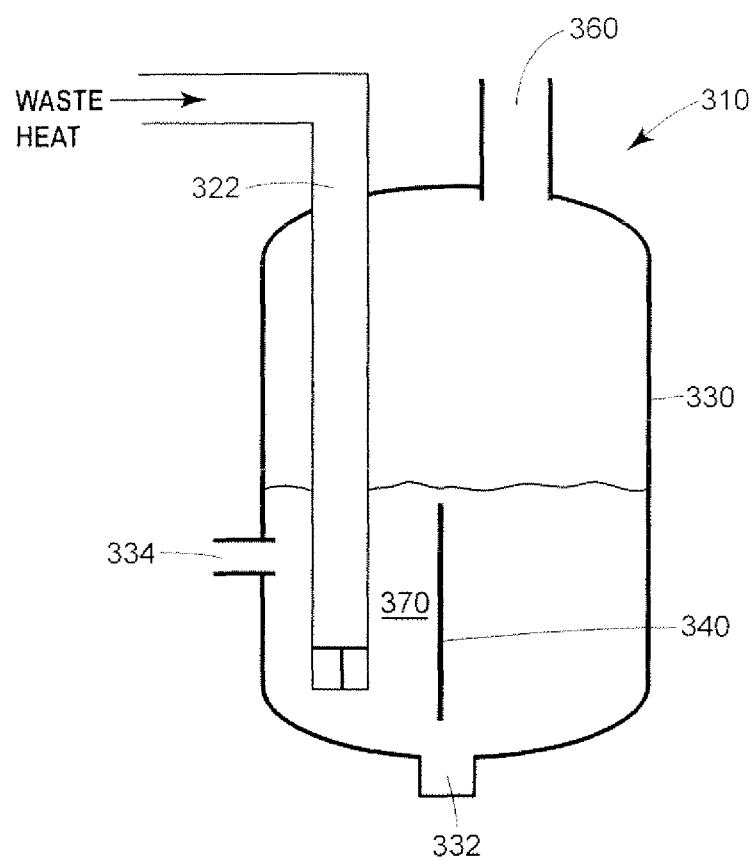
FIG. 5 is a cross-sectional view of a fourth fluid scrubber connected to a source of waste heat.

Turning now to FIG. 5, a fluid scrubber 310 in the form of a submerged gas reactor is shown which is similar to the fluid scrubber of FIG. 1, and in which like components are labeled with numbers exactly 300 greater than the corresponding elements of FIG. 1. Unlike the device 10 of FIG. 1, the fluid scrubber 310 of FIG. 5 does not include a pressurized burner but, alternatively, receives gases directly from an external source, which may be for example, a flare slack, a reciprocating engine, a turbine, or other source of waste heat. The gases supplied by the external source may include gases having a wide range of temperature and/or specific components. Accordingly, the scrubbing liquid, may be selected by one skilled in the art to achieve any combination of a rate and degree of chemical reaction between components in the gas and liquid.

Figure 6:
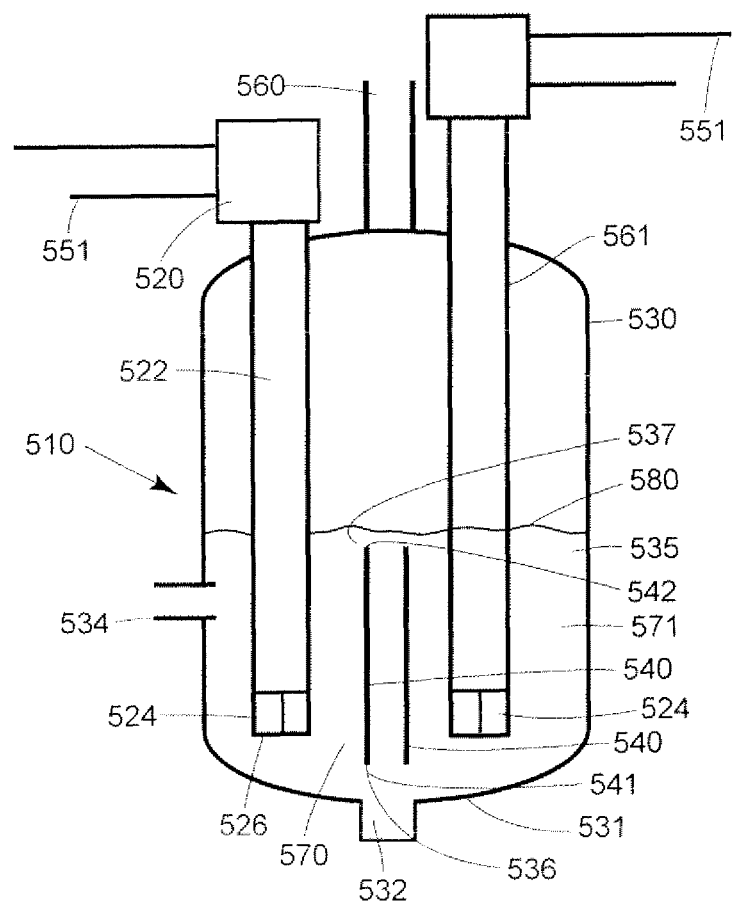
FIG. 6 is a cross-sectional view of a fifth fluid scrubber having multiple weirs and multiple gas inlet tubes.

The embodiment of a fluid scrubber 510 shown in FIG. 6 includes multiple gas tubes 522 and multiple weirs 540. The evaporator vessel 530 may include more than one gas tube 522 and/or more than one weir 540 to increase scrubbing capability without a significant increase in the size of the fluid scrubber 510.

Figure 7:
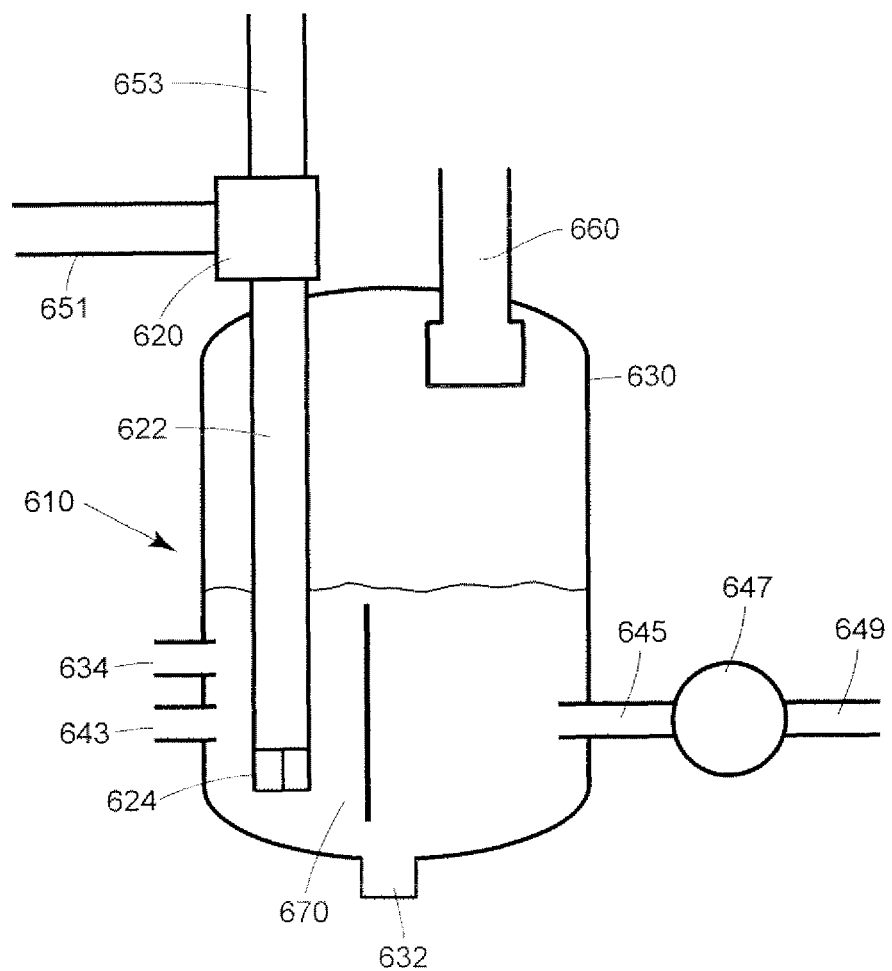
FIG. 7 is a cross-sectional view of a sixth fluid scrubber for treating landfill leachate and landfill gas having a high concentration of hydrogen sulfide.

An embodiment of a fluid scrubber 610 particularly useful in treating landfill leachate is shown in FIG. 7. This fluid scrubber 610 treats landfill leachate with a direct fired landfill gas burner 620 fed by landfill gas through line 651 and air through line 653. In particular, both landfill gas and landfill leachate are simultaneously treated in this embodiment.

While most municipal waste landfills have relatively low levels of hydrogen sulfide ($H_2S$) in their landfill gas (e.g., less than 100 parts per million), landfills that accept construction and demolition debris generally have much higher levels of $H_2S$ (e.g., 1,000 to 30,000 parts per million). $H_2S$ is particularly troublesome because it is poisonous, it has a noxious odor at very low concentrations, and it produces sulfur oxides when burned. Because landfills are generally required to treat landfill gas (e.g., burn the gas), high levels of $H_2S$ can cause a landfill to exceed emission limits for sulfur oxides ($SO_x$) in exhaust gas from processes used to burn the landfill gas; (e.g., engines and flares).

The fluid scrubber shown in FIG. 7 co-treats landfill gas having high concentrations of $H_2S$ through a fluid scrubbing operation and landfill leachate through a combination air stripping/evaporation process. When the landfill gas containing high levels of $H_2S$ is burned in the pressurized burner 620, the $H_2S$ content of the gas is mostly converted to sulfur oxides. Caustic (e.g., sodium hydroxide, or other alkaline solution or slurry) may be introduced into the vessel 630 through a caustic inlet 643 as a means to neutralize sulfur oxides as the fluid scrubber affects transfer of the sulfur oxides from the gas to the scrubbing liquid, in this case landfill leachate mixed with caustic. Thus, as the combusted landfill gas is supplied under pressure through the gas tube 622 and sparge ports 624, the combusted landfill gas mixes with the leachate delivered through the leachate inlet 634 and the caustic delivered through the caustic inlet 643. A vigorous mixing occurs in the confined space 670 as described above. The acidic gases are neutralized by the caustic (forming e.g., a sulfate salt) and the treated combustion gas is exhausted to the atmosphere (or transported for further treatment) through the exhaust vent 660.

Co-incident with the treatment of the combustion gas, the landfill leachate is concentrated as the energy (heat) required for removing water from the leachate is transferred from the hot combustion gas. Additionally, the intimate contact between combustion gas and scrubbing liquid within the fluid scrubber 610 effectively strips volatile compounds from the leachate to the exhaust vapor phase. The concentrated leachate is drawn out of the vessel 630 through a concentrated leachate delivery line 645 that delivers the concentrated leachate to a pH adjustment tank 647 where the pH of the concentrated leachate is adjusted to meet post-treatment or disposal requirements. Thus, the fluid scrubber shown in FIG. 7 treats both the landfill gas and the landfill leachate simultaneously thereby increasing treatment efficiency and reducing operational costs.

It will be understood that, because the weir and gas dispersion configurations within the fluid scrubbers illustrated in the embodiments of FIGS. 1-7 provide for a high degree of mixing, induced turbulent flow and the resultant intimate contact between liquid and gas within the confined volumes 70, 170, 270, etc., the fluid scrubbers of FIGS. 1-7 create a large interfacial surface area for the interaction of the scrubbing liquid and the gas provided via the gas inlet tube, leading to very efficient heat and mass transfer between gas and liquid phases and/or high rates of chemical reactions between components within these two phases. Furthermore, the use of the weir and, if desired, the baffle, to cause a predominantly horizontal flow pattern of the gas/liquid mixture at the surface of the scrubbing liquid mitigates or eliminates the entrainment of droplets of scrubbing liquid within the gas. Still further, the high degree of turbulent flow within the reaction vessel mitigates or reduces the formation of large crystals or agglomerates and maintains the mixture of solids and liquids within the reaction vessel in a homogeneous state to prevent or reduce settling of precipitated solids. This factor, in turn, reduces or eliminates the need to frequently clean the reaction vessel. In the event that such solids do form, however, they may be removed via the outlet port 32 (FIG. 1) using a conventional valve arrangement.

While several different types of fluid scrubbers having different weir configurations are illustrated herein, it will be understood that the shapes and configurations of the components, including the weirs, baffles and gas entry ports, used in these devices could be varied or altered as desired. Thus, for example, while the gas inlet tubes are illustrated as being circular in cross section, these tubes could be of any desired cross sectional shape including, for example, square, rectangular, oval, etc. Additionally, while the weirs illustrated herein have been shown as flat plates or as tubular members having a circular cross-sectional shape, weirs of other shapes or configurations could be used as well, including weirs having a square, rectangular, oval, or other cross sectional shape disposed around a fire or other gas inlet tube, weirs being curved, arcuate, or multi-faceted in shape or having one or more walls disposed partially around a fire or gas inlet tube, etc. Also, the gas entry ports shown as rectangular may assume most any shape including trapezoidal, triangular, circular, oval, or triangular. Furthermore, the weirs need not be solid surfaces and may be perforated or latticed if desired.

Still further, as will be understood by persons skilled in the art, the fluid scrubbers described herein may be operated in continuous, batch or combined continuous and batch modes. Thus, in one instance the fluid scrubber may be initially charged with a controlled amount of scrubbing liquid and operated in a batch mode. In the batch mode, liquid feed is continuously added to the fluid scrubber to maintain a constant predetermined level within the reaction vessel by replacing any components of the scrubbing liquid that are evaporated and/or reacted as the process proceeds. Once the batch process has reached a predetermined degree of concentration, completeness of a chemical reaction, amount or form of precipitate, or any combination of these or other desirable attributes, the process may be shutdown and the desirable product of the process may be withdrawn from the fluid scrubber for use, sale or disposal. In the continuous mode, liquid feed would be continuously added to the fluid scrubber to maintain a constant predetermined level within the reaction vessel by replacing any components of the scrubbing liquid that are evaporated and/or reacted as the process proceeds. Once the scrubbing liquid has reached a predetermined degree of concentration, completeness of a chemical reaction, amount or form of precipitate, or any combination of these or other desirable attributes, withdrawal of scrubbing liquid at a controlled rate from the reaction vessel would be initiated. The controlled withdrawal of the scrubbing liquid would be set at an appropriate rate to maintain a desirable equilibrium between the rate of feed of the scrubbing liquid and the gas, the rate of evaporation of components from the scrubbing liquid, and the rate at which the desired attribute or attributes of the process are attained. Thus, in the continuous mode, the fluid scrubber may operate for an indeterminate length of time as long as there is scrubbing liquid available and the system remains operational. The combined continuous and batch mode refers to operation where, for instance, the amount of available scrubbing liquid is in excess of that required for a single batch operation, in which case the process may be operated for relatively short periods in the continuous mode until the supply of scrubbing is exhausted.

The fluid scrubbers described above are ideally suited for virtually any type of fluid scrubbing process and could easily be adapted to treat combustion gases produced by other activities. For example flue gas desulfurization is a necessary process to remove $SO_2$ from coal fired plants. Because a coal fired plant is naturally producing a combustion gas, the combustion gasses could easily be blown into the gas tube of the fluid scrubbers described above, thus immediately treating the combustion gasses. Furthermore, the flue gases need not be cooled before treatment because the flue gasses are introduced directly into the scrubbing liquid which shields the reaction vessel walls from the hot flue gasses.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of removing pollutants from a gas in a fluid scrubber having a weir disposed within a reaction vessel to define first and second volumes within the reaction vessel and a gas delivery tube extending into the reaction vessel into the first volume, the method comprising:
   supplying scrubbing fluid to the reaction vessel at a rate sufficient to maintain a scrubbing fluid surface level in the reaction vessel above a first end of the weir and at or above a second end of the weir when the pollutants are being removed;
   providing polluted gas through the gas delivery tube to force the polluted gas through an exit in the gas delivery tube to cause mixing of the polluted gas and the scrubbing fluid within the first volume by creating a circular flow of scrubbing fluid from the first volume upward around the second end of the weir into the second volume and from the second volume downward around a first end of the weir and into the first volume;
   separating treated gas from the scrubbing liquid as the treated gas and scrubbing liquid pass over the second end of the weir from the first volume to the second volume, and
   removing the treated gas through an exhaust stack in the reaction vessel,
   wherein the mixture of polluted gas and scrubbing fluid undergoes chemical reactions that bind the pollutants in the scrubbing fluid.

2. The method of claim 1, further including removing scrubbing fluid with suspended solid particulate from the reaction vessel.

3. The method of claim 1, further including removing scrubbing fluid from the reaction vessel via a fluid exit.

4. The method of claim 1, wherein providing polluted gas through the gas delivery tube includes providing combustion gas through the gas delivery tube.

5. The method of claim 1, further including combusting a fuel to create the polluted gas.

6. The method of claim 1, wherein providing the polluted gas causes the scrubbing fluid to at least partially evaporate.

7. A method of removing pollutants from a gas in a fluid scrubber having a weir disposed within a reaction vessel to define first and second volumes within the reaction vessel and a gas delivery tube extending into the reaction vessel into the first volume, the method comprising:
   supplying scrubbing fluid to the reaction vessel at a rate sufficient to maintain a scrubbing fluid surface level in the reaction vessel near or above a second end of the weir;
   combusting a fuel to create a polluted gas,
   providing the polluted gas through the gas delivery tube to force the polluted gas through an exit in the gas delivery tube to cause mixing of the polluted gas and the scrubbing fluid within the first volume by creating a circular flow of scrubbing fluid from the first volume upward around the second end of the weir into the second volume and from the second volume downward around a first end of the weir and into the first volume; and
   removing treated gas through an exhaust stack in the reaction vessel,
   wherein the mixture of polluted gas and scrubbing fluid undergoes chemical reactions that bind pollutants in the scrubbing fluid, and
   wherein the fuel is landfill gas and the landfill gas contains at least some hydrogen sulfide and further comprising reacting at least some hydrogen sulfide with oxygen during combustion of the landfill gas to create sulfur dioxide.

8. The method of claim 7, further comprising dissolving at least some of the sulfur oxide in the scrubbing fluid thereby creating an acid.

9. The method of claim 8, further comprising adding an alkaline solution or slurry to the scrubbing fluid.

10. The method of claim 9, further comprising reacting the acid with the alkaline solution or slurry to create a sulfate salt.

* * * * *